United States Patent
Kramer

(10) Patent No.: US 12,428,999 B1
(45) Date of Patent: Sep. 30, 2025

(54) REAL-TIME THERMAL COKING SENSOR

(71) Applicant: RTX Corporation, Farmington, CT (US)

(72) Inventor: Stephen K. Kramer, Cromwell, CT (US)

(73) Assignee: RTX CORPORATION, Farmington, CT (US)

(*) Notice: Subject to any disclaimer, the term of this patent is extended or adjusted under 35 U.S.C. 154(b) by 0 days.

(21) Appl. No.: 18/624,840

(22) Filed: Apr. 2, 2024

(51) Int. Cl.
 *F02C 7/224* (2006.01)
 *F02C 7/30* (2006.01)
 *G01M 15/14* (2006.01)

(52) U.S. Cl.
 CPC ............ *F02C 7/30* (2013.01); *F02C 7/224* (2013.01); *G01M 15/14* (2013.01)

(58) Field of Classification Search
 CPC ............ F02C 7/14; F02C 7/224; G01N 27/14
 See application file for complete search history.

(56) References Cited

U.S. PATENT DOCUMENTS

| | | | | |
|---|---|---|---|---|
| 5,181,008 A | * | 1/1993 | Martin | H01C 1/036 374/E7.021 |
| 10,196,988 B2 | | 2/2019 | Farnum et al. | |
| 10,823,075 B2 | | 11/2020 | Glahn et al. | |
| 2009/0313999 A1 | | 12/2009 | Hunter et al. | |
| 2012/0044969 A1 | * | 2/2012 | Zebrowski | G01K 3/06 374/E1.001 |
| 2012/0285402 A1 | * | 11/2012 | Foster | F02C 9/18 62/7 |
| 2017/0336149 A1 | * | 11/2017 | Ribarov | F28F 13/06 |
| 2019/0277201 A1 | * | 9/2019 | Veilleux, Jr. | B64D 37/32 |

* cited by examiner

*Primary Examiner* — Gerald L Sung
(74) *Attorney, Agent, or Firm* — CANTOR COLBURN LLP

(57) ABSTRACT

A gas turbine engine fuel system includes a fuel delivery system, an oil cooling subsystem, and a fuel conditioning subsystem. The fuel delivery subsystem delivers fuel to a gas turbine engine, and the oil cooling subsystem receives heated oil from the gas turbine engine. The fuel conditioning subsystem includes a fuel/oil cooler that is in fluid communication with the fuel delivery subsystem to receive the fuel and is in fluid communication with the oil cooling subsystem to receive the heated oil, the fuel/oil cooler configured to transfer heat from the heated oil to the fuel. A thermal coking sensor is in fluid communication with the fuel and is configured to generate a signal in response to interacting with the fuel. A controller is configured to determine a coking temperature indicating an onset of coking in the fuel based on the signal.

14 Claims, 5 Drawing Sheets

REAL-TIME THERMAL COKING SENSOR

BACKGROUND

This disclosure relates to gas turbine engines, and more particularly to gas turbine engine fuel system.

Gas turbine engines typically include a compressor section, a combustor section and a turbine section. During operation, air is pressurized in the compressor section, mixed with fuel, and burned in the combustor section to generate hot combustion gases. The hot combustion gases are communicated through the turbine section, which extracts energy from the hot combustion gases to power the compressor section and other gas turbine engine loads.

It is common for the gas turbine engine system to not only use the fuel to provide the energy needed to power the turbines, but also to function as a heat sink to remove heat from system components. In systems where fuel is used as a fuel/oil heat exchanger or as a motive fluid to drive fueldraulic actuators, the heat generated by those systems can be transferred (e.g., added) to fuel and removed from the components to prevent over-heating. Heat can also be transferred to the fuel as it passes through the fuel nozzles into the combustor.

BRIEF DESCRIPTION

According to a non-limiting embodiment, a gas turbine engine fuel system includes a fuel delivery system, an oil cooling subsystem, and a fuel conditioning subsystem. The fuel delivery subsystem delivers fuel to a gas turbine engine, and the oil cooling subsystem receives heated oil from the gas turbine engine. The fuel conditioning subsystem includes a fuel/oil cooler that is in fluid communication with the fuel delivery subsystem to receive the fuel and is in fluid communication with the oil cooling subsystem to receive the heated oil, the fuel/oil cooler configured to transfer heat from the heated oil to the fuel. A thermal coking sensor is in fluid communication with the fuel and is configured to generate a signal in response to interacting with the fuel. A controller is configured to determine a coking temperature indicating an onset of coking in the fuel based on the signal.

In addition to one or more of the features described above, or as an alternative to any of the foregoing embodiments, the thermal coking sensor comprises a reference wire configured to generate a first heat loss; and a sensing wire configured to generate a second heat loss.

In addition to one or more of the features described above, or as an alternative to any of the foregoing embodiments, the first heat loss is generated in response to constantly receiving a first electrical current, and the second heat loss is generated in response to periodically receiving a second electrical current.

In addition to one or more of the features described above, or as an alternative to any of the foregoing embodiments, the controller compares the first heat loss to the second heat loss and determines the coking temperature indicating the onset of coking in response to the second heat loss deviating from the first heat loss.

In addition to one or more of the features described above, or as an alternative to any of the foregoing embodiments, the controller compares a temperature of the fuel delivered to a manifold of the gas turbine engine to the coking temperature, and controls the fuel conditioning subsystem in response to the temperature of the fuel reaching the coking temperature.

In addition to one or more of the features described above, or as an alternative to any of the foregoing embodiments, a temperature sensor disposed between the fuel conditioning subsystem and the manifold.

In addition to one or more of the features described above, or as an alternative to any of the foregoing embodiments, the thermal coking sensor is disposed between the fuel delivery subsystem and the fuel conditioning subsystem.

In addition to one or more of the features described above, or as an alternative to any of the foregoing embodiments, a bypass valve configured to vary an amount of the heated oil delivered to the fuel/oil cooler, wherein the controller adjusts the bypass valve based on the comparison between the coking temperature and the temperature of the fuel delivered to the manifold.

In addition to one or more of the features described above, or as an alternative to any of the foregoing embodiments, the controller adjusts the bypass valve to increase the amount of the heated oil delivered to the fuel/oil cooler in response to the temperature of the fuel be less than or equal to the coking temperature, and adjusts the bypass valve to decrease the amount of the heated oil delivered to the fuel/oil cooler in response to the temperature of the fuel being greater than the coking temperature.

According to another non-limiting embodiment, a thermal coking sensor comprises a reference wire configured to be disposed in fuel to a generate a first heat loss into the fuel in response to being constantly heated; and a sensing wire configured to be disposed in the fuel to generate a second heat loss into the fuel in response to being periodically heated. The thermal coking sensor determines a coking temperature indicating an onset of coking in the fuel based on a difference between the second heat loss and the first heat loss.

In addition to one or more of the features described above, or as an alternative to any of the foregoing embodiments, the reference wire is configured to generate the first heat loss; and the sensing wire is configured to generate the second heat.

In addition to one or more of the features described above, or as an alternative to any of the foregoing embodiments, the coking temperature is detected in response to the second heat loss being greater than the first heat loss.

In addition to one or more of the features described above, or as an alternative to any of the foregoing embodiments, an integrated fluid conduit configured to divert a portion of the fuel to the reference and sensing wires.

In addition to one or more of the features described above, or as an alternative to any of the foregoing embodiments, the integrated fluid conduit comprises a fluid inlet branch configured to receive the portion of the fluid from a fuel line, and deliver the portion of the fluid to the reference and sensing wires; and a fluid outlet branch configured to receive the portion of the fluid flowing past the reference and sensing wires, and return the portion of the fluid to the fuel line.

According to yet another non-limiting embodiment, a method of controlling a fuel temperature of fuel flowing in a gas turbine engine is provided. The method comprises delivering the fuel from a fuel delivery subsystem to the gas turbine engine, delivering an amount of heated oil from the gas turbine engine to a fuel/oil cooler included in a fuel conditioning subsystem, and transferring heat from the amount of heated oil to the fuel via the fuel/oil cooler. The method further comprises generating a signal via a thermal coking sensor that interacts with the fuel, determining, via a controller, a coking temperature indicating an onset of coking in the fuel based on the signal, and controlling the fuel/oil cooler to adjust an amount of heat delivered to the fuel based on determining the onset of coking.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed turbine vane and method of cooling are presented herein by way of exemplification and not limitation with reference to the FIGS.

When utilizing the gas turbine engine fuel as a heat sink, the amount of heat that can be added to the fuel is limited by the temperature at which the fuel starts to varnish and form coke. Currently, petroleum derived jet fuels start to thermally and oxidatively degrade at temperatures in the range of 400 degrees Fahrenheit (F°). To maintain safe operation, fuel temperatures are limited to less than that to avoid the formation of coke and varnish in the fuel nozzle. This limits the amount of heat that can be placed in the fuel by the heat exchangers and actuators. Commonly, the temperature limit set for fuel exiting the heat exchangers is much lower than the initial coking temperature in order to provide margin for the safe operation of the engine.

It is desired to put more heat in the fuel. There is much waste heat in an engine and aircraft: heat from the gears and bearings lubricated by oil; heat from electronics, and so on. If this heat can be placed into the fuel, it helps with engine efficiency: hotter fuel has more energy than cooler fuel. For every 100 F° increase in fuel temperature, there is a 0.3% savings in fuel burn. Sustainable Aviation Fuels (SAFs) have been shown to have higher coking temperatures than petroleum-derived jet fuels. However, these fuels are only now coming into use, and the limits of a mixture of SAF and petroleum based jet fuel are not the same as a pure SAF. So as more and more SAF enters into use, it is desired to utilize the higher temperature capacity of the SAF as additional heat sink and fuel burn reduction.

Various non-limiting embodiments of the present disclosure provides a thermal coking sensor that provides a real-time temperature measurement of the fuel flowing through the gas turbine engine. The temperature measurement, referred to herein as the "coking temperature," can be utilized to determine a real-time temperature threshold at which the fuel can be heated before the fuel begins experience coking. In this manner, the maximum amount of heat to be placed in the fuel can be determined in real-time, thereby allowing the gas turbine engine system to actively control the fuel temperature to prevent the occurrence of coking.

Figure 1:
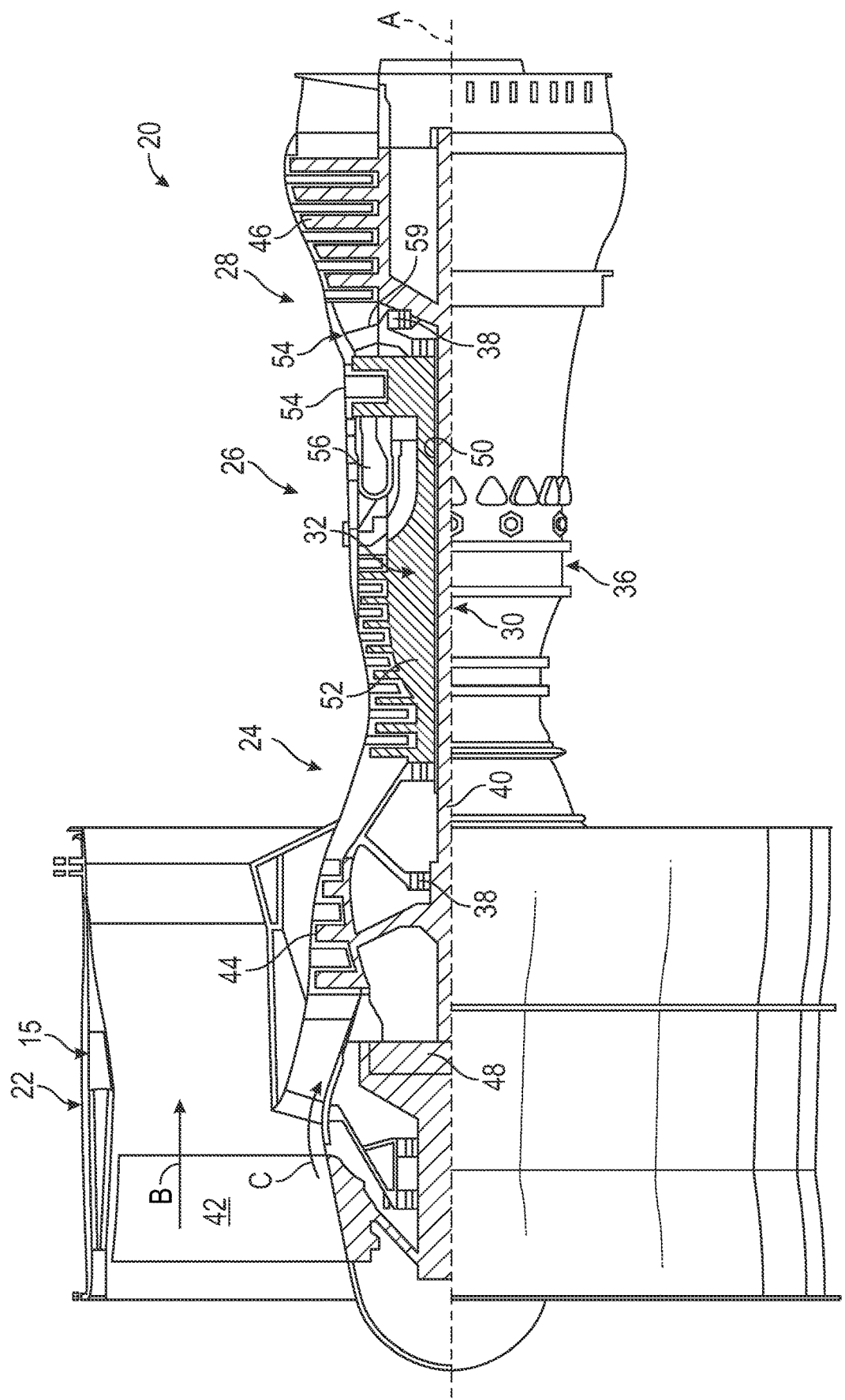
FIG. 1 depicts a gas turbine engine according to a non-limiting embodiment of the present disclosure.

With reference now to FIG. 1, a gas turbine engine 20 is schematically shown according to a non-limiting embodiment of the present disclosure. The gas turbine engine 20 disclosed herein is provided as one non-limiting example of an engine the sensor of the present disclosure may be used in. In other words, the sensor and method of operation using logic based on the sensor's output may be used in any suitable gas turbine engine and its use is not limited to the specific engine architectures illustrated in the attached FIGS. The gas turbine engine 20 illustrated in FIG. 1 may be referred to as a two-spool turbofan that generally incorporates a fan section 22, a compressor section 24, a combustor section 26 and a turbine section 28. Alternative engines might include other systems or features. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first or low pressure compressor 44 and a first or low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. It being understood that various embodiments of the present disclosure are applicable to engines that may or may not have the aforementioned geared architecture 48. The high speed spool 32 includes an outer shaft 50 that interconnects a second or high pressure compressor 52 and a second or high pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions and configurations of the fan section 22, compressor section 24, combustor section 26, turbine section 28, and fan drive gear system 48 may be varied. For example, gear system 48 may be located aft of combustor section 26 or even aft of turbine section 28 or removed entirely, and fan section 22 may have different configurations and/or may be positioned forward or aft of the location of gear system 48.

Figure 2:
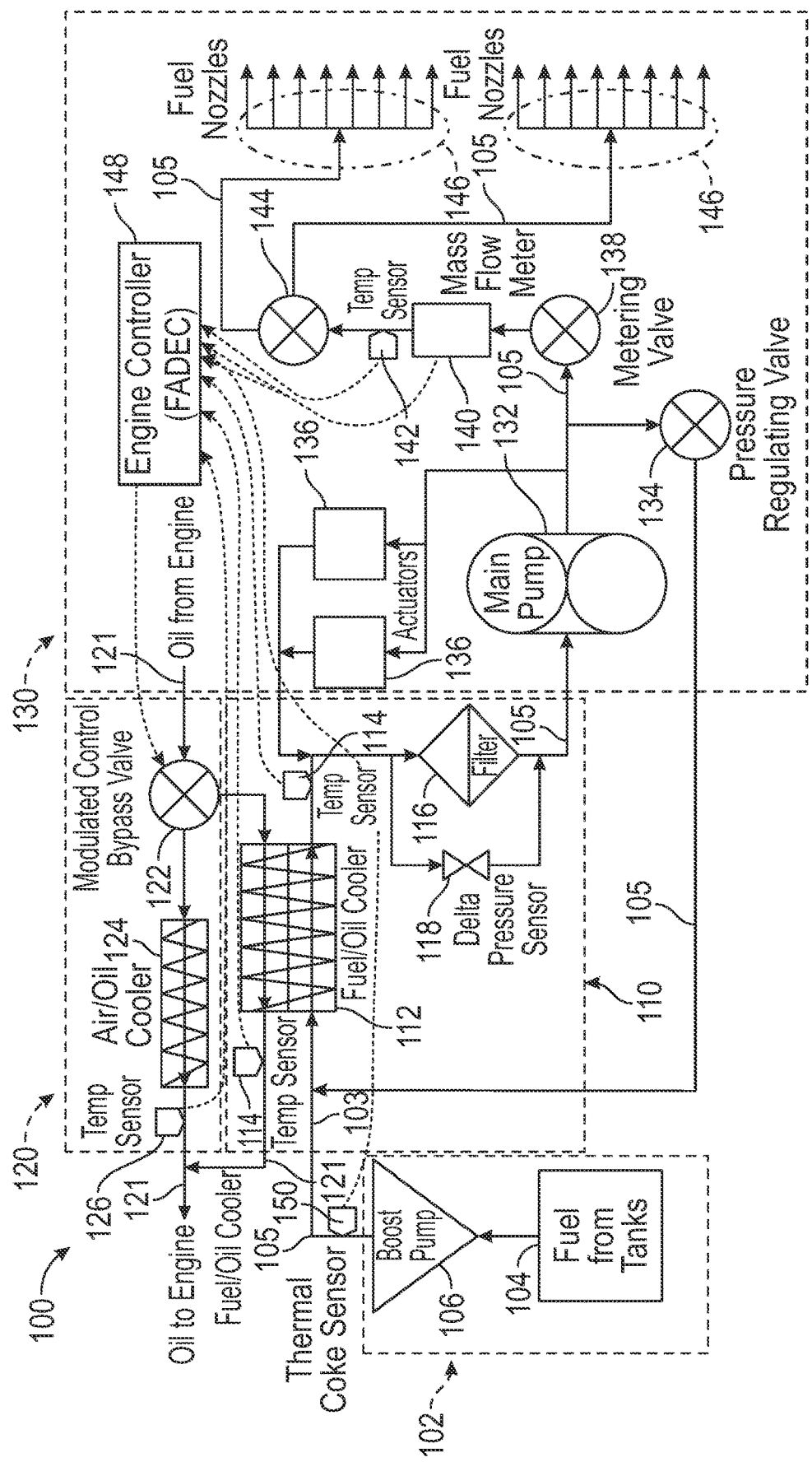
FIG. 2 is a schematic diagram illustrating gas turbine engine fuel system according to a non-limiting embodiment of the present disclosure.

With reference now to FIG. 2, a gas turbine engine fuel system 100 is illustrated according to a non-limiting embodiment of the present disclosure. The gas turbine engine fuel system 100 includes a fuel delivery subsystem 102, a fuel conditioning subsystem 110, an oil cooling subsystem 120, an engine control subsystem 130, and a thermal coking sensor 150.

The fuel delivery subsystem 102 is configured to deliver fuel to the gas turbine fuel system 100. The fuel delivery subsystem 102 includes one or more fuel tanks 104 and a boost pump 106. The fuel tanks 104 provide an initial stage where low-pressure fuel is stored. The boost pump 106 operates to increase the pressure of fuel stored in the tanks 104 to a higher pressure suitable for operating a gas turbine engine (e.g., engine 20) before delivering the fuel to the fuel conditioning subsystem 110 via a fuel line 103.

The fuel conditioning subsystem 110 is in fluid communication with the fuel delivery subsystem 102 and operates to ensure the delivered fuel is at a target pressure, a target temperature, and a target cleanliness level for operating the gas turbine engine. The fuel conditioning subsystem 110 includes a fuel/oil cooler 112, a fuel temperature sensor 114, a fuel filter 116, and a delta pressure sensor 118. The fuel/oil cooler 112 includes a fuel flow path to pass fuel received from the 102 and an oil flow path to pass oil received from the 120. The fuel performs a heat exchanging process that transfers the temperature of heated oil output from the gas turbine engine to the cooler fuel that flows through the fuel/oil cooler 112. The fuel temperature sensor 114 is located downstream from the fuel/oil cooler 112 and monitors the fuel temperature to ensure it reaches the target fuel temperature. The fuel filter 116 filters the fuel to remove impurities before the fuel is injected into the gas turbine engine. The delta pressure sensor 118 is placed in fluid communication with the fuel flowing through the fuel filter 116 and measures the pressure difference across the fuel filter 116. The measured pressure difference can be used to diagnose the operation of the fuel filter 116 and alert of any potential clogs or maintenance while also ensuring the fuel pressure remains at a target pressure level.

The oil cooling subsystem 120 is in signal communication with the engine control subsystem 130 and circulates oil 121 through the gas turbine engine. The oil cooling subsystem 120 includes a modulated control bypass valve 122, an air/oil cooler 124, and an oil temperature sensor 126. The modulated control bypass valve 122 receives heated oil 121 from the gas turbine engine and is controlled by the engine control subsystem 130 (e.g., a controller 148) to adjust the flow of the oil 121 to either the air/oil cooler 124 or the fuel/oil cooler 112.

When the bypass valve 122 is adjusted into a first position, for example, the valve 122 delivers the heated oil 121 to the fuel/oil cooler 112 while bypassing the air/oil cooler 124. As a result, the heat from the oil 121 is transferred to the fuel 105 flowing through the fuel/oil cooler 112. When the bypass valve 122 is adjusted into a second position, however, the heated oil 121 is delivered to the air/oil cooler 124 while bypassing the fuel/oil cooler 112. As a result, cooling of the fuel 105 is reduced while the oil 121 continues to be cooled by air/oil cooler 124. In one or more non-limiting embodiments, the bypass valve 122 can be adjusted between the first and second positions into one or more intermediate positions to deliver more fuel to the fuel/oil cooler 112 than the air/oil cooler 124 and vice versa. Thus, the cooling of the oil 121 can still be achieved, while actively controlling the amount of heat transferred to the fuel 105 without overheating the fuel 105 so as to prevent the onset of fuel coking.

The oil temperature sensor 126 is in signal communication with the engine control subsystem 130 and outputs a temperature signal indicating the temperature of the oil 121 output from the air/oil cooler 124. When, for example, the temperature of the oil 121 is less than an oil temperature threshold, the engine control subsystem 130 adjusts the bypass valve 122 to the oil 121 to the air/oil cooler 124. When the oil temperature is greater than or equal to the oil temperature threshold, the controller adjusts the bypass valve 122 to establish a bypass oil path and delivers the heated oil to the fuel/oil cooler 112.

When the bypass valve is adjusted into the first position, the air/oil cooler 124 receives the oil 121 output from the engine. The air/oil cooler 124 operates by using ambient air, which is has a temperature that is less than the temperature of the oil 121 output from the engine, to absorb heat from the engine oil 121 as it passes through a an oil path within the air/oil cooler 124. According to a non-limiting embodiment, the heat exchange process can be enhanced using forced air flow, either from the aircraft's motion or auxiliary fans (not shown), which further reduces the oil temperature before the oil 121 is recirculated back into the engine.

When the bypass valve 122 is adjusted into the second position, the heated oil is delivered to an oil path in the fuel/oil cooler 112, which is located on an opposite side of the fuel path. The design of the fuel/oil cooler 112 ensures that these two fluids flow in close proximity to each other, separated by the walls of the cooler's channels, yet without mixing. As the heated oil 121 flows through the oil path, the oil's temperature decreases as its heat is conducted through the channel walls and absorbed by the fuel 105. The heat exchange process provided by the fuel/oil cooler not only cools down the oil 121, making it suitable for recirculation back into the engine for continued lubrication and cooling, but also heats the fuel 105. In addition, heating the fuel 105 is desirable in order to reduce its viscosity, thus reducing the work required to pump the fuel 105 to the high pressures required by the gas turbine engine. Heating the fuel also enables better performance of the fueldraulic actuators, improves the atomization of the fuel 105 leading to lower amounts of soot and non-volatile particulate emissions, and enables the waste heat from the engine that is captured by the oil 121 to be used to improve engine cycle efficiency rather than dumping the heat into the air bypass stream.

The engine control subsystem 130 includes a fuel pump 132, a pressure regulating valve 134, one or more fuel-driven actuator 136, a metering valve 138, a mass flow meter 140, a temperature sensor 142, a fuel injection valve 144, one or more fuel injection nozzles 146, and a controller 148. The fuel pump 132 pressurizes the filtered fuel to target pressure necessary to combustion. According to a non-limiting embodiment, the controller 148 can actively control the fuel pump 132 based on changing operating conditions of the gas turbine engine so that the fuel pressure meets a target pressure level.

The fuel 105 output from the pump 132 can be utilized to operate one or more fuel-driven actuators 136 (also referred to as "fueldraulic" actuators 136). For example, the 105 provides the motive force for controlling engine bleeds, clearance control valves, and compressor vanes positions. According to a non-limiting embodiment, the position of the fuel-driven actuators 136 is directed by the logic from the engine controller 148, and are powered by the pressure and flow from the fuel.

The pressure regulating valve 134 can be utilized to tune the fuel pressure and ensure it meets the target pressure level. The pressure regulating valve 134 can be a passive regulating valve or can be actively controller (e.g., by the controller 148). Accordingly, the pressure regulating valve 134 is adjusted (e.g., the flow path) to increase or decrease the flow of fuel passed therethrough based on real-time pressure readings.

The metering valve 138 can be controlled by the controller 148 to adjust the amount of the fuel delivered to the fuel injection nozzles 146 based on fuel demand. The mass flow meter 140 is disposed downstream from the metering valve 138 and measures the actual amount of fuel delivered to the engine. According to a non-limiting embodiment, the mass flow meter 140 outputs a flow signal to the controller 148, which indicates a real-time measurement of the amount of fuel delivered to the gas turbine engine. In this manner, the controller 148 can determine a fuel demand, and adjust the metering valve 138 to control the amount of fuel to be delivered to the gas turbine engine.

The fuel temperature sensor 142 is disposed upstream from the fuel nozzles 146. According to a non-limiting embodiment, the fuel temperature 142 can be implemented as a thermocouple, for example, and outputs a temperature signal indicating a temperature of the fuel input to the fuel nozzles 146 (e.g., a nozzle fuel input temperature). Accordingly, the controller 148 receives the temperature signal and processes/decodes it to determine the fuel temperature before it is delivered into the fuel nozzles 146.

The fuel injection valve 144 and fuel injection nozzles 146 operate together to deliver the fuel 105 into the engine. According to a non-limiting embodiment, the fuel injection valve 144 can be adjusted by the controller 148 to vary the amount of fuel delivered to the fuel injection nozzles 146. The fuel injection nozzles 146 atomizes the fuel 105 and delivers fuel into the engine combustor (not shown). While the fuel flows through the fuel injection nozzles 146, the fuel temperature will increase due to the fuel nozzle being immersed in the hot gases from the compressor. It should be appreciated that the number of fuel nozzle groups and/or the number of fuel nozzles 146 in each group can be more or less than shown in FIG. 2 without departing from the scope of the invention.

The thermal coking sensor 150 is in signal communication with the controller 148 and can provide a real-time temperature measurement indicating a coking temperature of the fuel 105 flowing through the gas turbine engine. As described in greater detail below, the thermal coking sensor 150 operates by using two heated wires sampling the same fuel supply. One wire serves as a reference wire, which provides a baseline or comparison measurement and is constantly heated within a set temperature of a range of temperatures known to not causes any thermal degradation of the fuel 105. A very small fraction of the fuel is passed over the reference wire and the heat loss from the wire is measured. The second resistance wire serves as a sensing wire and is periodically heated from a starting temperature. Although resistive wires are described herein, it should be appreciated that other contact heating elements can be used without departing from the scope of the present disclosure.

Electrical current can be selectively delivered to the sensing wire so that the sensing wire begins heating from a starting temperature (e.g., from the set temperature of the reference wire), and continues heating up until the fuel 105 starts to degrade due to the onset of coking. The onset of coking can be determined by the heat loss from the sensing wire being different than predicted or expected heat loss from the reference wire. The thermal coking sensor 150 therefore takes advantage of the well-behaved change in heat loss when there is no thermal degradation of the fuel 105, compared to the not-well behaved nature of heat loss as the fuel 105 thermally decomposes by the heat added into the fuel 105 by the sensing wire. The sensing wire is then allowed to reduce in temperature, which would happen rapidly due to the very small thermal mass of the sensing wire, and then heated again to determine the thermal breakdown temperature of the next portion of the fuel 105 flowing past it. This periodic cycling would happen during the operation of the engine, providing a periodic update, every few seconds, of the fuel coking temperature.

The controller 148 can output one or more signals to operate the thermal coking sensor 150, and can receive a thermal measurement signal from the thermal coking sensor 150, which can then be used to determine the coking temperature of the fuel 105. For example, the controller 148 can determine the coking temperature based on the output thermal measurement signal, and then utilize the coking temperature to determine a real-time temperature threshold at which the fuel 105 can be heated before the fuel begins experience coking. In this manner, the maximum amount of heat to be placed in the fuel 105 (e.g., via the fuel/oil cooler 112) can be determined in real-time, thereby allowing the fuel system 100 to actively control the fuel temperature to prevent the occurrence of coking.

According to a non-limiting embodiment, the controller 148 can control the fuel system 100 to periodically cool the fuel to prevent it from experiencing coking for a prolonged amount of time. In one or more non-limiting embodiments, the temperature at which coking is detected can be used by the controller 148 to actively set a pre-coking temperature (e.g., a temperature less than the temperature at which coking was detected) of the fuel 105 in real-time. For example, the controller 148 can utilize the temperature measurement provided by the thermal coking sensor 150 to determine an amount of heat that can be placed into the fuel by adjusting the bypass valve 122, e.g., by selectively delivering the heated oil 121 to either the fuel/oil cooler 112 or the air/oil cooler 124. In this manner, the coking temperature can be tailored in real-time to the capacity of the fuel 105 going through the gas turbine engine.

According to a non-limiting embodiment, the temperature from the coking temperature sensor 150 is used in conjunction with the temperature measured by the temperature sensor 142 to determine the amount of heat that can be added to the fuel 105 without inducing the onset of coking. As described above, the temperature of the fuel 105 delivered to the fuel nozzles 146 will increase due to the fuel nozzle being immersed in the hot gases from the compressor. Therefore, the temperature measured by the temperature sensor 142 (e.g., the nozzle fuel input temperature) needs to be less than the coking temperature determined using the coking temperature sensor 150 in order to take into account the increase in fuel temperature caused by the fuel nozzle atomization.

The controller 148 compares the nozzle fuel input temperature measured by the temperature sensor 142 with the coking temperature determined using the coking temperature sensor 150. When the nozzle fuel input temperature is greater than the coking temperature, the controller 148 actively adjusts the bypass valve 122 to reduce the amount of heated oil 121 delivered to the fuel/oil cooler 112, thereby reducing the heat added to the fuel 105 so as to reduce the fuel temperature. When the nozzle fuel input temperature is less than or equal to the coking temperature, however, the controller 148 actively adjusts the bypass valve 122 to increase the amount of heated oil 121 delivered to the fuel/oil cooler 112, thereby increasing the heat added to fuel 105 so as to increase the fuel temperature. Accordingly, the controller 148 can actively prevent, or at least mitigate, coking of the fuel nozzles 146, while also maximizing the heat sink potential of the fuel 105 and the fuel burn benefit of heated fuel (e.g., 0.3% for 100 F° in temperature rise).

Figure 3:
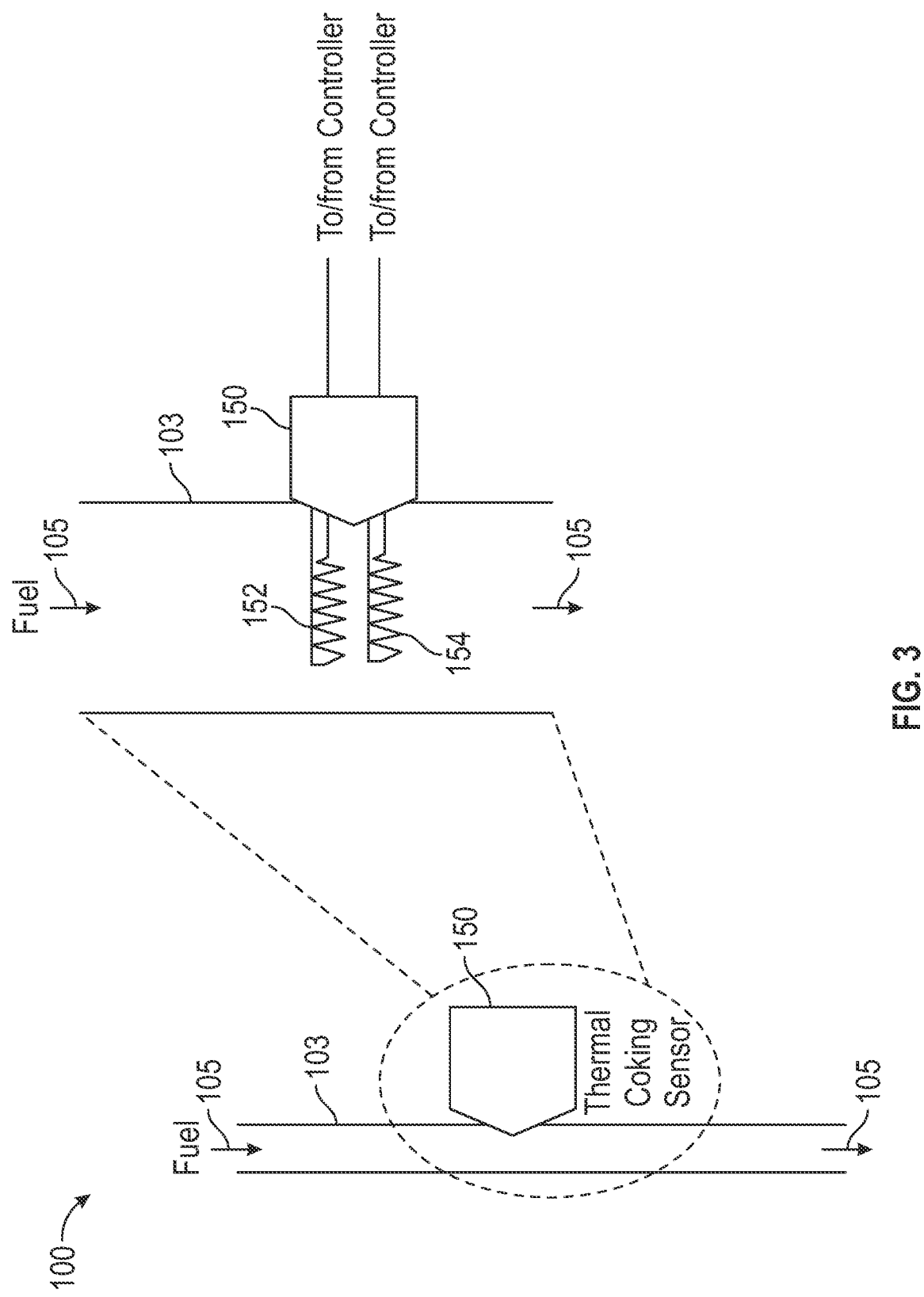
FIG. 3 depicts a thermal coking sensor included in the gas turbine engine fuel system according to a non-limiting embodiment of the present disclosure.
Figure 4:
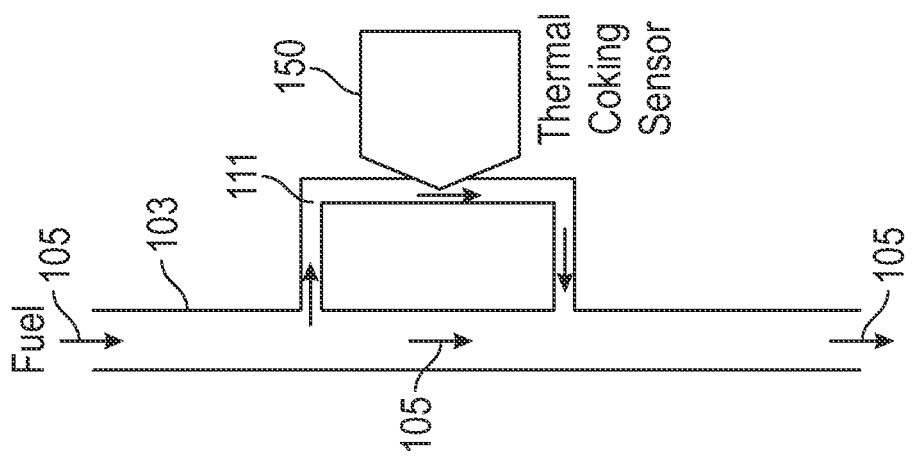
FIG. 4 depicts a thermal coking sensor included in the gas turbine engine fuel system according to a non-limiting embodiment of the present disclosure.

Turning to FIG. 3, a thermal coking sensor 150 is illustrated according to a non-limiting embodiment of the present disclosure. The thermal coking sensor 150 utilizes two heated wires 152 and 154 that are be placed in fluid communication with the fuel 105 flowing through the fuel system 100. According to a non-limiting embodiment, the thermal coking sensor 150 can be coupled to the input fuel line 103 so that it is disposed in fluid communication with the main fuel flow 105 as shown in FIG. 3. In other non-limiting embodiments, the thermal coking sensor 150 can be coupled to a side branch 111 of fuel line 103 so that is measures the fuel 105 at a lower flow rate to determine a coking temperature as shown in FIG. 4.

In either arrangement, the fuel 105 flowing past the wires 152 and 154 can cool them such that the resulting heat loss in the fuel 105 can be measured in accordance with a concept referred to as "hot wire anemometry". According to a non-limiting embodiment, one of the coking sensor wires is constantly heated to generate a first heat loss. Accordingly, one wire is used as a reference wire 152 to measure the heat loss of the fuel at a fairly low temperature at which no cooking occurs. The other coking sensor wire is periodically heated for a heating time period to generate a second heat loss and cooled for a cooling time period such that it is used as a sensing wire 154 to determine the temperature at which the onset of coking occurs.

During the initial time point of the heating time period, the heat loss of the sensing wire 154 will be similar to the reference wire 152. As the sensing wire 154 gets hotter during the heating time period, it will react with the fuel 105 to realize coking reactions that cause the heat loss from the sensing wire 154 to deviate from the heat loss of the reference wire 152. The coking reactions and resulting endothermic event causes a slightly higher heat loss from the sensing wire 154. As the temperature of the of the sensing wire 154 changes, the current and voltage associated with the sensing wire 154 changes indicating the onset of fuel coking.

As described herein, the thermal coking sensor 150 is in electrical communication with the controller 148. The controller 148 outputs one or more power signals that constantly delivers electrical current through the reference wire 152 and periodically delivers electrical current through the sensing wire 154. The controller also 140 monitors the current/voltage supplied to the reference wire 152 and the sensing wire 154 to determine the temperature of the of the s wires 152 and 154 and the heat loss associated with the wires 152 and 154. For example, the controller 148 can correlate a change in the current/voltage of the sensing wire 154 with a temperature change and heat loss of the sensing wire 154. Accordingly, the controller 148 can determine when the sensing wire 154 begins to have a slightly higher heat loss than the reference wire 152 that should have a constant reference temperature and heat loss since it is constantly heated. Thus, once the sensing wire 154 is determined to have a greater heat loss than the reference wire 152, the controller 148 determines that the fuel 105 has reached the coking temperature and the onset of coking has been induced. In a non-limiting embodiment, the controller 148 compares the first heat loss of the reference wire 152 to the second heat loss of the sensing wire 154, and determines the onset of coking in response to the second heat loss deviating from the first heat loss. The controller 148 can also determine when the heat loss deviation exceeds a threshold value to detect the onset of coking.

Figure 5:
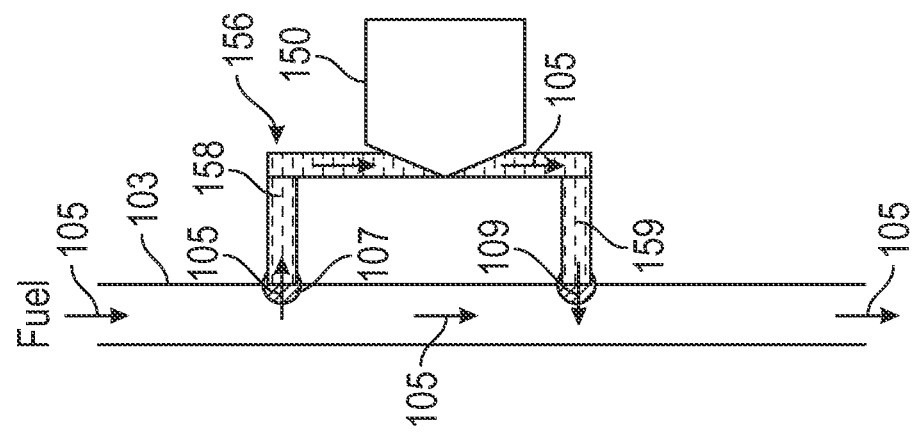
FIG. 5 depicts a thermal coking sensor included in the gas turbine engine fuel system according to a non-limiting embodiment of the present disclosure.

FIG. 5 illustrates a thermal coking sensor 150 according to a non-limiting embodiment of the present disclosure. The operation of the thermal coking sensor 150 in accordance with the concept of hot wire anemometry is the same as described above, and will note be repeated for the sake of brevity. The thermal coking sensor 150 includes an integrated fluid conduit 156 configured to divert a portion of the fuel 105 from the fuel line 103 to the thermal coking sensor 150 (e.g., to the reference wire 152 and the sensing wire 154). According to a non-limiting embodiment, the integrated fluid conduit 156 includes a fluid inlet branch 158 and a fluid outlet branch 159. The fluid inlet branch 158 can be coupled in fluid communication with a first port 107 that is formed in the fuel line 103 and the fluid outlet branch 159 can be coupled in fluid communication with a second port 109 that is formed in the fuel line 103. The fluid inlet branch 158 receives the portion of the fuel 105 from a fuel line 103, and delivers it to the reference and sensing wires 152 and 154. The fluid outlet branch 159 receives the portion of the fuel 105 flowing past the reference and sensing wires 152 and 154, and returns the portion of the fuel 105 to the fuel line 103. Accordingly, at least a portion of the reference and sensing wires can be disposed in the integrated fluid conduit 156 to realize the fuel flow so that the thermal coking sensor 150 can determine a coking temperature based on a portion of the fuel 105 having a lower flow rate.

Figure 6:
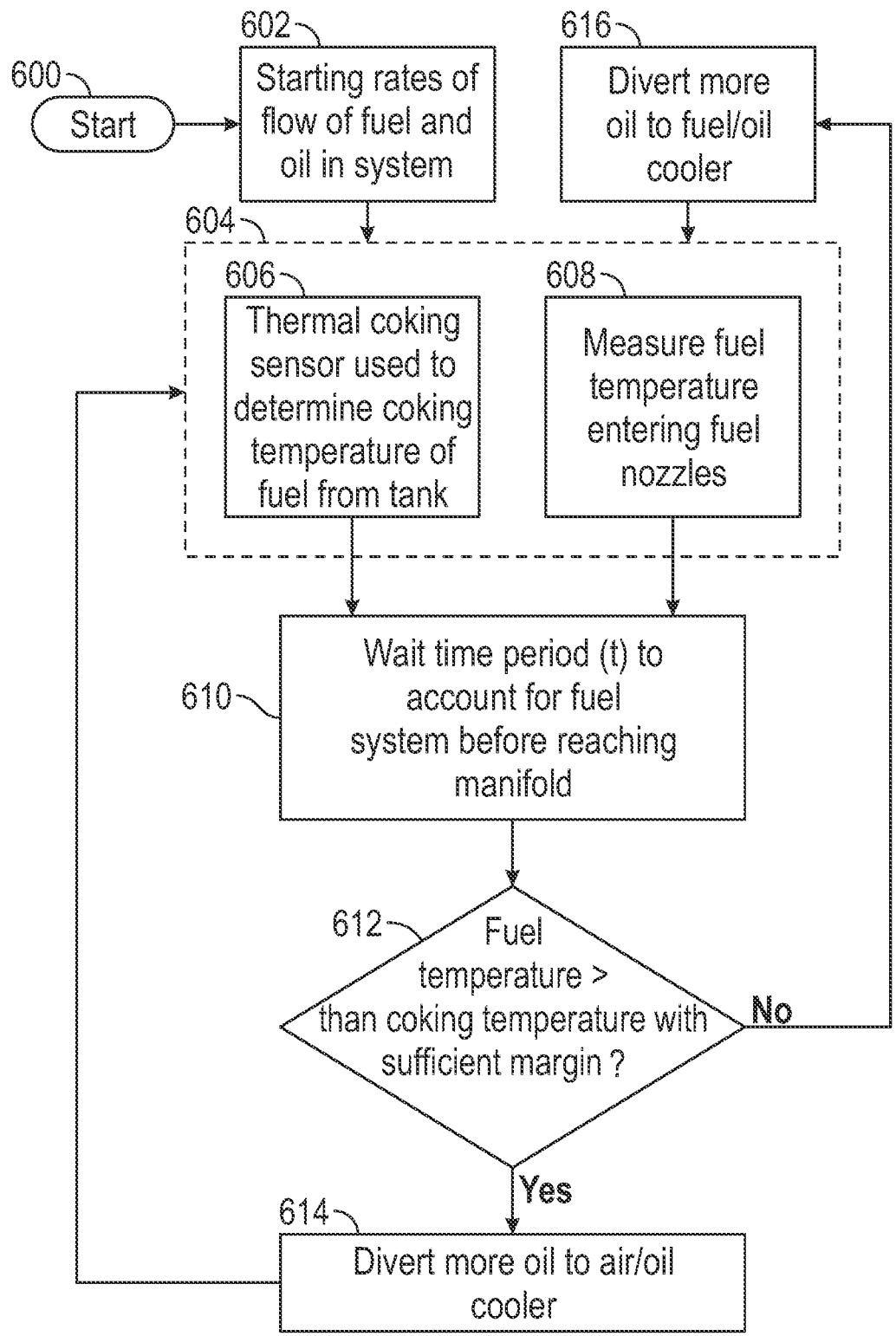
FIG. 6 is a flow diagram illustrating a method of controlling oil flow in a gas turbine engine fuel system based on a fuel coking temperature according to a non-limiting embodiment of the present disclosure.

Turning now to FIG. 6, a method of actively controlling fuel temperature based on a fuel coking temperature is illustrated according to a non-limiting embodiment of the present disclosure. The method begins at operation 600, and at operation 602 initial amounts of fuel 105 and heated oil 121 are delivered to the fuel system 100 according to a fuel flow rate and an oil flow rate. At operation 604, fuel temperature measurements are performed. The fuel temperature measurements include determining a real-time coking temperature using the thermal coking sensor 150 at operation 606 and measuring the fuel temperature entering the fuel nozzles 146 using a temperature sensor 142 at operation 608. At operation 610, the method waits a time period (t) to account for fuel system operation before the fuel 105 reaches the fuel nozzles 146 and manifold. This delay takes into account the time it takes for the fuel 105 to get from the thermal coking sensor 150 to the temperature sensor 142. Accordingly, the controller 148 can be synchronized in order to make the proper adjustment and not allow the fuel 105 to be overheated At operation 612, a determination is made as to whether the fuel temperature delivered to the fuel nozzles 146 is greater than the coking temperature. When True, a greater amount of heated oil 121 is diverted to the air/oil cooler 124 compared to the fuel/oil cooler 112 at operation 614 to reduce the amount of heat added to the fuel 105. Fuel temperature measurements are then continued at operation 604. When FALSE, however, an additional amount of heated oil 121 is diverted to the fuel/oil cooler 112 compared to the air/oil cooler 124 to increase the amount of heat added to the fuel 105 at operation 616. Fuel temperature measurements are then continued at operation 604. Accordingly, the method can continue to actively vary the fuel temperature and prevent coking of the fuel 105 and fuel nozzles 146.

The term "about" is intended to include the degree of error associated with measurement of the particular quantity based upon the equipment available at the time of filing the application. For example, "about" can include a range of +8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A gas turbine engine fuel system comprising:
a fuel delivery subsystem to deliver fuel to a gas turbine engine;
an oil cooling subsystem configured to receive heated oil from the gas turbine engine;
a fuel conditioning subsystem including a fuel/oil cooler that is in fluid communication with the fuel delivery subsystem to receive the fuel and is in fluid communication with the oil cooling subsystem to receive the heated oil, the fuel/oil cooler configured to transfer heat from the heated oil to the fuel;
a thermal coking sensor in fluid communication with the fuel, the thermal coking sensor configured to generate a signal in response to interacting with the fuel; and
a controller in signal communication with the thermal coking sensor, the controller configured to determine a coking temperature indicating an onset of coking in the fuel based on the signal,
wherein the thermal coking sensor comprises:
a reference wire configured to generate a first heat loss; and
a sensing wire configured to generate a second heat loss,
wherein the controller is configured to heat the reference wire to a first temperature and is configured to heat the sensing wire to a second temperature greater than the first temperature.

2. The gas turbine engine fuel system of claim 1, wherein the first heat loss is generated in response to constantly receiving a first electrical current, and the second heat loss is generated in response to periodically receiving a second electrical current.

3. The gas turbine engine fuel system of claim 2, wherein the controller compares the first heat loss to the second heat loss and determines the coking temperature indicating the onset of coking in response to the second heat loss deviating from the first heat loss.

4. The gas turbine engine fuel system of claim 3, wherein the controller compares a temperature of the fuel delivered to a manifold of the gas turbine engine to the coking temperature, and controls the fuel conditioning subsystem in response to the temperature of the fuel reaching the coking temperature.

5. The gas turbine engine fuel system of claim 4, further comprising a temperature sensor disposed between the fuel conditioning subsystem and the manifold.

6. The gas turbine engine fuel system of claim 5, wherein the thermal coking sensor is disposed between the fuel delivery subsystem and the fuel conditioning subsystem.

7. The gas turbine engine fuel system of claim 4, further comprising a bypass valve configured to vary an amount of the heated oil delivered to the fuel/oil cooler, wherein the controller adjusts the bypass valve based on the comparison between the coking temperature and the temperature of the fuel delivered to the manifold.

8. The gas turbine engine fuel system of claim 7, wherein the controller adjusts the bypass valve to increase the amount of the heated oil delivered to the fuel/oil cooler in response to the temperature of the fuel being less than or equal to the coking temperature, and adjusts the bypass valve to decrease the amount of the heated oil delivered to the fuel/oil cooler in response to the temperature of the fuel being greater than the coking temperature.

9. A method of controlling a fuel temperature of fuel flowing in a gas turbine engine fuel system,
the gas turbine engine fuel system comprising:
a fuel delivery subsystem to deliver fuel to a gas turbine engine;
an oil cooling subsystem configured to receive heated oil from the gas turbine engine;
a fuel conditioning subsystem including a fuel/oil cooler that is in fluid communication with the fuel delivery subsystem to receive the fuel and is in fluid communication with the oil cooling subsystem to receive the heated oil, the fuel/oil cooler configured to transfer heat from the heated oil to the fuel;
a thermal coking sensor in fluid communication with the fuel, the thermal coking sensor configured to generate a signal in response to interacting with the fuel; and
a controller in signal communication with the thermal coking sensor, the controller configured to determine a coking temperature indicating an onset of coking in the fuel based on the signal,
wherein the thermal coking sensor comprises:
a reference wire configured to generate a first heat loss; and
a sensing wire configured to generate a second heat loss,
wherein the controller is configured to heat the reference wire to a first temperature and is configured to heat the sensing wire to a second temperature greater than the first temperature, the method comprising:
deliver the fuel from the fuel delivery subsystem to the gas turbine engine;
delivering an amount of the heated oil from the gas turbine engine to the fuel/oil cooler included in the fuel condition subsystem;

transferring heat from the amount of heated oil to the fuel via the fuel/oil cooler;

generating the signal via the thermal coking sensor that interacts with the fuel;

determining, via the controller, the coking temperature indicating the onset of coking in the fuel based on the signal, controlling the fuel/oil cooler to adjust an amount of heat delivered to the fuel based on the determining the onset of coking.

10. The method of claim 9, wherein generating the signal comprises:

generating a first signal from the reference wire indicating the first heat loss;

generating a second signal from the sensing wire indicating the second heat loss;

wherein the coking temperature is determined based on a comparison between the first heat loss and the second heat loss.

11. The method of claim 10, wherein the first heat loss is generated in response to constantly receiving a first electrical current, and the second heat loss is generated in response to periodically receiving a second electrical current.

12. The method of claim 11, wherein the coking temperature is detected in response to the second heat loss deviating from the first heat loss.

13. The method of claim 12, further comprising:

comparing, via the controller, a temperature of the fuel delivered to a manifold of the gas turbine engine to the coking temperature; and controlling the fuel/oil cooler in response to the temperature of the fuel reaching the coking temperature.

14. The method of claim 13, wherein controlling the fuel/oil cooler comprises:

increasing an amount of the heated oil delivered to the fuel/oil cooler in response to the temperature of the fuel being less than or equal to the coking temperature; and decreasing the amount of the heated oil delivered to the fuel/oil cooler in response to the temperature of the fuel being greater than the coking temperature.

\* \* \* \* \*